US012811886B2

(12) United States Patent
Pham et al.

(10) Patent No.: US 12,811,886 B2
(45) Date of Patent: Nov. 24, 2026

(54) DEVICE AND METHOD FOR SMART POLICY ROUTING

(71) Applicant: HUAWEI TECHNOLOGIES CO., LTD., Shenzhen (CN)

(72) Inventors: Tran Anh Quang Pham, Colombes (FR); Sebastien Martin, Boulogne Billancourt (FR); Jeremie Leguay, Boulogne Billancourt (FR); Xu Gong, Dongguan (CN); Feng Zeng, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 18/611,120

(22) Filed: Mar. 20, 2024

(65) Prior Publication Data

US 2024/0236006 A1 Jul. 11, 2024

Related U.S. Application Data

(63) Continuation of application No. PCT/CN2021/119654, filed on Sep. 22, 2021.

(51) Int. Cl.
*H04L 47/2425* (2022.01)
*H04L 45/64* (2022.01)
*H04L 47/125* (2022.01)

(52) U.S. Cl.
CPC .......... *H04L 47/2425* (2013.01); *H04L 45/64* (2013.01); *H04L 47/125* (2013.01)

(58) Field of Classification Search
CPC ... H04L 47/2425; H04L 45/64; H04L 47/125; H04L 47/41; H04W 40/00; H04W 28/0268; H04W 40/12; H04W 40/18
See application file for complete search history.

(56) References Cited

U.S. PATENT DOCUMENTS 8,203,954 B1 6/2012 Patel et al.
8,787,400 B1 7/2014 Barth et al.
(Continued)

FOREIGN PATENT DOCUMENTS

CN 108683611 A 10/2018
CN 112019371 A 12/2020
IN 201927040161 A 1/2020

OTHER PUBLICATIONS

Keqiang He et al. "Presto:Edge-based Load Balancing for Fast Datacenter Networks",SIGCOMM Comput. Commun. Rev.45,Oct. 4, 2015,total 14 pages.
M.Alizadeh et al."CONGA:Distributed Congestion-aware Load Balancing for Datacenters",In SIGCOMM,2014, total 12 pages.
A. Dixit et al.On the Impact of Packet Spraying in Data Center Networks.In INFOCOM,2013.total 9 pages.
(Continued)

*Primary Examiner* — Bailor C Hsu
(74) *Attorney, Agent, or Firm* — WOMBLE BOND DICKINSON (US) LLP

(57) ABSTRACT

The present disclosure relates to smart policy routing in a network. To this end, a network entity is configured to obtain policy information from a controller. The policy information can include one or more global intents and information about at least one SLA requirement for each of the plurality of flow groups. Furthermore, each global intent is indicative of one requirement of a network operator. The network entity further makes one or more routing decisions for the plurality of flow groups based on the policy information. In some examples, a controller is configured to provide policy information to the network entity.

18 Claims, 6 Drawing Sheets

500

(56) References Cited

U.S. PATENT DOCUMENTS

| | | | | |
|---|---|---|---|---|
| 9,923,798 | B1 | 3/2018 | Bahadur et al. | |
| 10,873,533 | B1 * | 12/2020 | Ismailsheriff | H04L 47/2441 |
| 11,381,474 | B1 * | 7/2022 | Kumar | H04L 41/0897 |
| 11,381,478 | B2 * | 7/2022 | Sundararajan | H04L 41/0894 |
| 11,405,280 | B2 * | 8/2022 | Nataraj | H04L 41/0896 |
| 11,405,318 | B2 * | 8/2022 | Wong | H04L 41/0668 |
| 11,838,188 | B1 * | 12/2023 | Liu | H04L 41/0895 |
| 12,155,530 | B1 * | 11/2024 | Backes | H04L 41/0883 |
| 2014/0226467 | A1 | 8/2014 | Park | |
| 2015/0016253 | A1 * | 1/2015 | Jaska | H04L 47/22 370/230.1 |
| 2015/0333969 | A1 | 11/2015 | Vasseur et al. | |
| 2016/0234099 | A1 | 8/2016 | Jiao | |
| 2016/0241436 | A1 | 8/2016 | Fourie et al. | |
| 2020/0167258 | A1 * | 5/2020 | Chattopadhyay | G06F 11/3495 |
| 2020/0328978 | A1 | 10/2020 | Gupta et al. | |
| 2020/0412647 | A1 | 12/2020 | Blair et al. | |
| 2021/0036987 | A1 | 2/2021 | Mishra et al. | |
| 2021/0234714 | A1 * | 7/2021 | Govindan | H04L 12/1886 |
| 2022/0095414 | A1 * | 3/2022 | Wang | H04L 41/082 |
| 2022/0321467 | A1 * | 10/2022 | Szigeti | H04L 45/302 |
| 2024/0244088 | A1 * | 7/2024 | Bhandaru | G06F 11/3006 |

OTHER PUBLICATIONS

J.Rasley et al. “Planck:Millisecond-scale Monitoring and Control for CommodityNetworks”, In SIGCOMM,2014,total 12 pages.

A.Kabbani et al. “FlowBender:Flow-level Adaptive Routing for Improved Latency and Throughput in Datacenter Networks”, In CoNEXT, 2014, total 11 pages.

J.Perry et al. “Fastpass:A Centralized “Zero-Queue” Datacenter Network”, In SIGCOMM, 2014, total 12 pages.

Wu-Hsiao Hsu et al. “An integrated end-to-end QoS anycast routing on DiffServ networks”, Computer Communications, vol. 30, Issue 6, 2007, total 13 pages.

D.Comer et al.“OSDF:An Intent-based Software Defined Network Programming Framework”,2018 IEEE 43rd Conference on Local Computer Networks (LCN),2018,total 9 pages.

“Performance Routing (PfR)”,total 3 pages,https://www.cisco.com/c/en/us/products/ios-nx-os-software/performance-routing-pfr/index.html.

Gopalan,Kartik et al.“Load balancing routing with bandwidth-delay guarantees.” IEEE Communications Magazine 42.6 (2004),total 7 pages.

“IMaster NCE Autonomous Network Management and Control System”, total 5 pages, https://e.huawei.com/uk/products/network-management-and-analysis-software/imaster-nce-wan.

* cited by examiner

DEVICE AND METHOD FOR SMART POLICY ROUTING

CROSS-REFERENCE TO RELATED APPLICATIONS

This application is a continuation of International Application No. PCT/CN2021/119654, filed on Sep. 22, 2021, the disclosure of which is hereby incorporated by reference in its entirety.

TECHNICAL FIELD

The present disclosure relates to communication networks, and particularly to traffic engineering in communication networks. In order to improve network utilization, and to meet user requirements, the disclosure proposes an intent-based smart policy routing. The disclosure is specifically concerned with load balancing traffic over multiple paths of a set of tunnels.

BACKGROUND

Traffic engineering plays a crucial role in improving network utilization and meeting user requirements. Routing over multiple paths helps to make better use of network capacity and allows dynamically selection of paths based on network conditions.

Multi-path routing is typically used in Software-Defined Wide Area Networks (SD-WAN) where a headquarter site and local branches (e.g., sites) of an enterprise can be interconnected through different networks (e.g., Multiprotocol Label Switching (MPLS), Internet, Long-Term Evolution (LTE)). In such an overlay network, a controller entity is often deployed at the headquarter site to manage the network while premises are equipped with access routers (ARs). The controller is responsible for the configuration of access routers and the update of high-level routing policies. In turn, access routers route traffic over the set of available overlay links so as to align with the policy defined by the controller and the local knowledge of network conditions (e.g., average delay, loss, jitter of overlay links).

At the individual application level, specific Quality of Service (QOS) or Service Level Agreements (SLA) requirements can be defined. Applications are generally mapped to different "flow groups" with different QoS requirements, for instance: Real-time (Moderate traffic, High SLA requirements), Business (High traffic, Moderate SLA requirements), and Bulk (Moderate traffic, Low/No SLA requirements).

At the global network level, several goals, or "intents", may be expressed by the network owner. It can be for instance the minimization of a financial cost, the minimization of the congestion or the maximization of performance. Optimizing intents and guaranteeing SLA may be conflicting objectives in nature. Indeed, minimizing a financial cost intent can lead to the selection of borderline paths in terms of QoS, inducing a risk to violate application SLAs.

Typically, load balancing IP networks are used to reduce congestion and it is implemented inside network devices such as switches or routers. As traffic and network conditions evolve, the load balancing of traffic must be adjusted to better use network resources and meet application requirements. In the state of the art, several solutions have been proposed to solve load balancing problems.

The Performance Routing (PfR)/iWAN solution has been released for the dynamic selection of paths in WAN networks so as to satisfy SLA requirements. In this architecture, the user defines a policy at the Master Controller (MC) level in terms of SLA requirements for each application. Access routers monitor the quality of the paths and send monitoring updates to MC. The controller then compares the quality of paths with application requirements and updates the path selection in routers if needed. This solution requires frequent communication between the device and the controller as paths are actually selected in the controller. It is then slow to react to the change of network conditions. Furthermore, the policy is only defined with Qos requirements or path preferences for each application. It is not optimized to satisfy a given global intent.

A link utilization (LU) based routing has been introduced to dynamically load balance traffic, where a link utilization threshold is assigned to links. When the LU of a link surpasses the threshold, this link is marked as "out-of-policy" (OOP). Then, traffic on OOP links is redirected to other available links until the LU of the link goes back to "in-policy" (under the given threshold). In another LU-based load balancing method, the available bandwidth of links is estimated. From the list of Equal Cost Multi-Paths (ECMP) computed by the shortest path first algorithm, it determines the minimum available bandwidth (MAB) of each path. Then, the weight of each path is determined according to MAB and the flows are allocated to ECMP paths according to the weights. In one conventional solution, traffic is distributed over paths proportionally to the capacity of the paths. These solutions address the load balancing problem by considering link utilization, however, they cannot guarantee SLA.

Load balancing may be done based on awareness of congestion in the network where a feedback loop between the source and destination is formed to detect congestion. However, each application has a different sensitivity to the congestion, e.g., Bulk applications tolerate light to moderate congestions while Real-time applications do not. In a delay-based load balancing solution, the delay of links is estimated with the current load and the remaining capacity, then the paths are selected to obtain a combined target (bandwidth, utilization, and delay). In another intent and QoS-based routing framework for openflow; routing decisions are taken in the controller for every flow. Even though this solution considers both SLA and intent, it only runs inside the controller and there is no support from devices to operate load balancing.

SUMMARY

In view of the above, this disclosure aims to introduce an intent-based policy routing method inside devices. An objective is to allow devices are in support of a network controller to meet global intents. One aim is to minimize the need for communication between the controller and devices. Another aim is to improve the satisfaction of SLA.

The objective is achieved by embodiments as provided in the enclosed independent claims. Advantageous implementations of the embodiments are further defined in the dependent claims.

A first aspect of the disclosure provides a network entity for routing a plurality of flow groups in a network, wherein the network entity is configured to obtain policy information from a controller, wherein the policy information comprises one or more global intents and information about at least one SLA requirement for each of the plurality of flow groups, wherein each global intent is indicative of one requirement of a network operator: and make one or more routing decisions for the plurality of flow groups based on the policy information.

In this disclosure, the network may be a software-defined network, e.g., SD-WAN. The network entity may be an access device, for instance, an access router (AR) in SD-WAN scenarios. This disclosure proposes a solution for intent-based policy routing inside devices. Possibly, the policy information may include routing policies, or load balancing policies. Devices (e.g., the network entity) are in support of a controller, which provides the policy information, to meet global intents.

In an embodiment of the first aspect, each global intent is indicative of a requirement of the network operator related to one of the following: link utilization, financial cost, quality, congestion, safety, stability, and performance.

Typically, the network operator or a network owner may intent to minimize the financial cost of the network, to minimize the network congestion, to maximize the network performance, to maximize the stability of the network (e.g., stick as much as possible to previous configurations), or to maximize the safety of the network (e.g., satisfy a maximum number of SLAs). One or more of these requirements may be included in the policy information, thereby allowing the network entity to make decisions taking such intents or requirements into account.

In an embodiment of the first aspect, the policy information further comprises information about a set of overlay links that can be used for routing the plurality of flow groups, wherein each overlay link comprises a plurality of underlay links.

In some embodiments, a set of active/backup links may be given, for example by a centralized controller. Notably, the centralized controller may be aware of the network topology and/or link characteristics (e.g., capacity; background traffic, packet loss, delay, etc.). The network entity makes routing decisions also taking information of the overlay links into account. Typically, an underlay link or network refers to a physical link or network, while an overlay link is a logical or virtual link that is overlaid on one or more physical links.

In an embodiment of the first aspect, the network entity is further configured to obtain a traffic prediction result and/or an SLA prediction result for each of the plurality of flow groups, wherein the traffic prediction result of each flow group comprises one or more traffic parameters of that flow group, and/or the SLA prediction result of each flow group comprises one or more QoS performance indicator of that flow group.

Notably, the network entity may be an SPR module implemented inside the AR. The network entity may obtain traffic prediction results and/or SLA prediction results from other modules (such as traffic prediction module, or SLA prediction module) inside the AR.

In an embodiment of the first aspect, making the one or more routing decisions for the plurality of flow groups comprises: making a routing decision for each of the plurality of flow groups based on the policy information, and the traffic prediction result and/or the SLA prediction result of that flow group.

In some embodiments, when the network entity makes routing decisions for each flow group, in addition to the policy information, it may further take the traffic prediction result and/or the SLA prediction result of that flow group into account. It should be noted that communication with the controller can be reduced and SLA satisfaction is better ensured, due to the use of predictions models for traffic and performance. As the optimization of intents can conflict with the optimization of SLAs, the use of prediction models allows the network entity to make efficient decisions (e.g., routing decisions or load balancing decisions), i.e., so that it can anticipate the consequences of the decisions it is taking.

In an embodiment of the first aspect, the network entity is further configured to monitor the plurality of flow groups to obtain statistical information for each of the plurality of flow groups, wherein the statistical information for each flow group comprises at least one of throughput information and a QoS statistics of that flow group: and perform traffic prediction on each of the plurality of flow groups based on the statistical information of that flow group, to obtain the traffic prediction result of each of the plurality of flow groups.

For instance, the network entity may be the AR itself that includes an SPR module. In such a case, the network entity produces the traffic prediction result.

In an embodiment of the first aspect, the traffic prediction is performed using a traffic prediction model.

Possibly, the traffic prediction models can be already embedded into the denetwork entity.

In an embodiment of the first aspect, the network entity is further configured to obtain one or more traffic prediction parameters related to the traffic prediction from the controller: and select the traffic prediction model from one or more trained models using the one or more traffic prediction parameters and/or train the traffic prediction model using the one or more traffic prediction parameters.

Possibly, the parameters related to traffic predictions may be used for selecting a particular traffic prediction model (History-based, SARIMA, machine learning) to use. In some embodiments, the parameters may be used as model parameters for configuring or training the selected model with some parameters.

In an embodiment of the first aspect, the network entity is further configured to provide the statistical information of the plurality of flow groups to the controller.

In an embodiment of the first aspect, the network entity is further configured to perform SLA prediction for each of the plurality of flow groups and for each overlay link of the set of overlay links using an SLA prediction model, to obtain the SLA prediction result of each of the plurality of flow groups.

In some embodiments, the network entity may further comprise an SLA prediction module for producing the SLA prediction result.

In an embodiment of the first aspect, the network entity is further configured to obtain one or more SLA prediction parameters related to the SLA prediction from the controller; and determine or activate the SLA prediction model using the one or more SLA prediction parameters.

In some embodiments, the parameters related to SLA predictions may be used for determining or activating the SLA prediction model.

In an embodiment of the first aspect, each global intent is associated with a priority or a weight indicating an order of importance of that global intent in the one or more global intents.

The priority or weight of each global intent may be provided by the network operator or owner.

In an embodiment of the first aspect, the one or more global intents includes a first global intent that is indicative of the requirement related to safety, and the first global intent is associated with a highest priority in the one or more global intents, wherein the first global intent indicates the network entity to make the routing decisions that meet the at least one SLA requirement.

In an embodiment of the first aspect, the one or more global intents includes a second global intent that is indicative of the requirement related to stability, and the second global intent is associated with a second highest priority in the one or more global intents, wherein the second global intent indicates the network entity to make the one or more routing decisions that minimize changes on one or more previous routing decisions.

Notably, the maximization of stability (also called "Stickiness") is often defined as a secondary intent, and the maximization of safety is often defined as a primary intent.

In an embodiment of the first aspect, the network entity is further configured to periodically make the one or more routing decisions for the plurality of flow groups, or make the one or more routing decisions for the plurality of flow groups in response to one or more trigger-events.

In some embodiments, the intent-based SPR in the devices can be periodic or event-triggered (e.g., by an external controller).

In an embodiment of the first aspect, the network entity is further configured to provide information about whether the network entity supports a particular global intent to the controller.

Notably, the controller can collect information about intent capabilities of devices, and provide the policy information including the global intents accordingly.

In an embodiment of the first aspect, the policy information comprises a first set of global intents dedicated for a first group of applications running on the network entity, and a second set of global intents dedicated for a second group of applications running on the network entity.

Intents can be defined globally for all applications or for different groups of applications/tenants. For instance, it may be desired to reduce the financial expenses induced by a given application from one group: while it may be also desired to increase the quality perceived by another application from one group. Intents can also be defined different for devices (e.g., core routers versus access routers). For instance, it may be desired to reduce the financial expenses induced by an enterprise branch.

In an embodiment of the first aspect, the network entity is further configured to make one or more load balancing decisions for the plurality of flow groups based on the policy information.

Possibly, the intent-based approach proposed in this disclosure can also apply to load balancing.

In an embodiment of the first aspect, making the one or more load balancing decisions for the plurality of flow groups comprises: making a load balancing decision for each of the plurality of flow groups based on the policy information, and the traffic prediction result and/or the SLA prediction result of that flow group.

In an embodiment of the first aspect, the network entity is an access router, and the network is a software-defined network.

A second aspect of the disclosure provides a controller for assisting of routing a plurality of flow groups in a network, wherein the controller is configured to provide policy information to a network entity, wherein the policy information comprises one or more global intents and information about at least one SLA requirement for each of the plurality of flow groups, wherein each global intent is indicative of one requirement of a network operator.

An embodiment of this disclosure thus proposes a controller for supporting the intent-based SPR method. Intents are provided to access devices, e.g., the network entity, so that the network entity makes efficient decisions (e.g., routing decisions or load balancing decisions), i.e., so that it can anticipate the consequences of the decisions it is taking.

In an embodiment of the second aspect, each global intent is indicative of a requirement of the network operator related to one of the following: link utilization, financial cost, quality, congestion, safety, stability, and performance.

In an embodiment of the second aspect, the policy information further comprises information about a set of overlay links that can be used for routing the plurality of flow groups, wherein each overlay link comprises a plurality of underlay links.

In an embodiment of the second aspect, the controller is configured to provide one or more traffic prediction parameters related to traffic prediction, and/or one or more SLA prediction parameters related to SLA prediction, to the network entity.

Possibly, the traffic prediction models can be already embedded into the devices. The controller may provide parameters related to traffic predictions to the network entity for selecting a particular traffic prediction model (History-based, seasonal auto-regressive integrated moving average (SARIMA), machine learning) to use.

In an embodiment of the second aspect, the controller is configured to obtain statistical information of the plurality of flow groups from the network entity, wherein the statistical information of each flow group comprises at least one of throughput information and a QOS statistics of that flow group.

In an embodiment of the second aspect, each global intent is associated with a priority or a weight indicating an order of importance of that global intent in the one or more global intents.

In an embodiment of the second aspect, the controller is configured to obtain information about whether the network entity supports a particular global intent from the network entity.

In an embodiment of the second aspect, providing policy information to a network entity further comprises providing the policy information based on the obtained information about whether the network entity supports a particular global intent.

In some embodiments, the controller can collect information about intent capabilities of devices, and provide the policy information including the global intents accordingly.

A third aspect of the disclosure provides a method for routing a plurality of flow groups in a network, wherein the method comprises: obtaining policy information from a controller, wherein the policy information comprises one or more global intents and information about at least one SLA requirement for each of the plurality of flow groups, wherein each global intent is indicative of one requirement of a network operator: and making one or more routing decisions for the plurality of flow groups based on the policy information.

Embodiments of the method of the third aspect may correspond to the embodiments of the network entity of the first aspect described above. The method of the third aspect and its embodiments achieve the same advantages and effects as described above for the network entity of the first aspect and its embodiments.

A fourth aspect of the disclosure provides a method for assisting of routing a plurality of flow groups in a network, wherein the method comprises providing policy information to a network entity, wherein the policy information comprises one or more global intents and information about at least one SLA requirement for each of the plurality of flow groups, wherein each global intent is indicative of one requirement of a network operator.

Embodiments of the method of the fourth aspect may correspond to the embodiments of the controller of the second aspect described above. The method of the fourth aspect and its embodiments achieve the same advantages and effects as described above for the controller of the second aspect and its embodiments.

A fifth aspect of the disclosure provides a computer program product comprising a program code for carrying out, when implemented on a processor, the method according to the third aspect and any embodiments of the third aspect, or the fourth aspect and any embodiments of the fourth aspect.

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and embodiments of the present disclosure will be explained in the following description of specific embodiments in relation to the enclosed drawings, in which.

DETAILED DESCRIPTION OF EMBODIMENTS

Illustrative embodiments of a network entity, a controller, and corresponding methods for traffic routing in a network are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
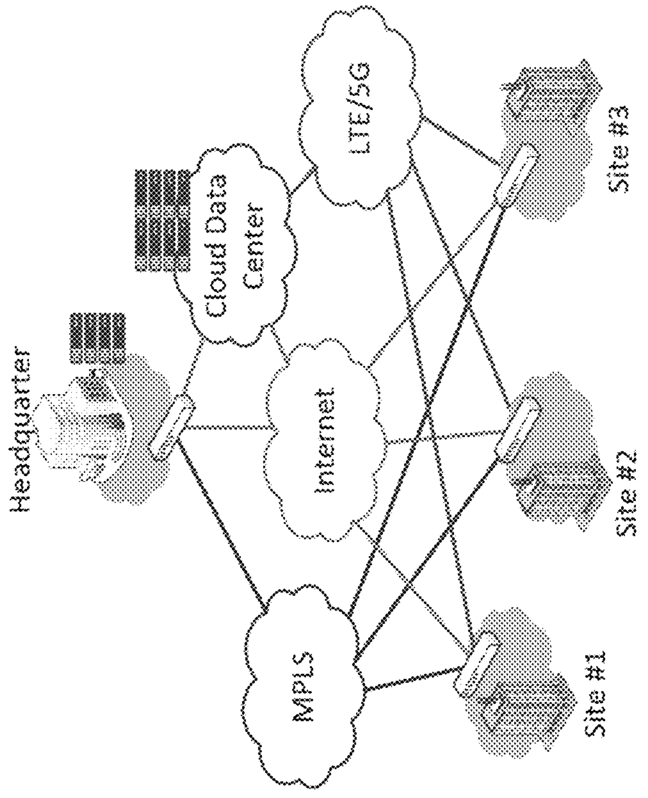
FIG. 1 shows an SD-WAN network.

For ease of understanding, SD-WAN network architectures are first described here. FIG. 1 shows an example of an SD-WAN network. As previously discussed, in SD-WAN a headquarter site and local branches (e.g., sites) of an enterprise can be interconnected through different networks. SD-WAN network architectures are typically split into two control entities operating at two different time scales. In a slow control loop, a global controller (often deployed at the headquarter site) updates policies and communicates them to devices. In a fast control loop, devices take tactical decisions following the evolution of traffic and network conditions. As an illustration of such architecture, it is presented following how the Smart Policy Routing (SPR) mechanism works inside devices and how it is assisted by the global controller.

Typically, load balancing IP networks are used to reduce congestion and it is implemented inside network devices such as switches or routers using two techniques: 1) hash-based splitting, where a hash is calculated over significant fields of packet headers, and is used to select the outgoing paths, and 2) Weighted Cost Multi-Pathing (WCMP), where load balancing weights are used to make decisions, e.g., to make sure that the number of flows on each outgoing path meets a certain ratio. These approaches generally aim at minimizing the Maximum Link Utilization (MLU). To select paths according to the QoS requirements of applications, more advanced techniques are required. They are either based on a flow table that maintains a specific forwarding rule for each flow; or based on the continuous assessment of a valid set of paths for multiple flows. The Smart Policy Routing (SPR) technology described here falls in the latter category.

For each flow group, a set of flows with similar requirements, access routers get an SPR policy from the controller that contains 1) the SLA requirements that must be satisfied and 2) a set of active/backup links that can be used for load balancing. The quality of each path in the pool of active and backup links (1 overlay link=1 path) is continuously monitored and evaluated using the Composite Measure Indicator (CMI). For example, CMI=800−((D, 500)+mi(J, 200)+min (L. 10)) with D (delay). L (packet loss) and J (jitter) being the real-time measurements and 500 ms, 10%, 200 ms being the respective QoS constraints. An overlay link, or a path, violating all constraints will be not chosen because its CMI is negative. The set of overlay links that remain eligible are used to load balance traffic. A switchover period (SW) and a Flapping suppression period (FSW) can be used to stabilize the system. During the SW period, if the quality of the path recovers, the switchover period is canceled. After switching traffic to a new link, within an FSW period, SPR may not perform a link switchover even if it does not obtain a good CMI (this is optional).

While SPR in devices focuses on SLA satisfaction for applications (e.g., flow groups), it is not aware of the global intents that need to be optimized at the network level.

In a conventional SPR solution, the controller periodically adjusts policies and communicates them to edge devices (i.e., ARs). To adjust policies, the goal of the controller is twofold: 1) helping devices to guarantee SLAs, and 2) satisfying network-level intents.

It takes as inputs:

1) measurements collected by the network monitoring system, for instance, average throughput of flow groups (per min/h/day/month), average overlay link throughput and QoS, average SLA measurements of each flow group per overlay link, and
2) user-defined information such as overlay link capacity, user's intention/objective: quality, cost, a balance between quality and cost, relative priority, preferred network, QoS requirements of each flow group.

Based on that, the controller updates, at a slow pace, the SPR policy of devices. The policy for each flow group includes the sets of active and backup links and QoS requirements.

A main issue with this two-level architecture is that the edge devices are not aware of global intents (they only focus on SLA guarantees) and the controller needs to interact frequently with devices to optimize global intents.

Figure 2:
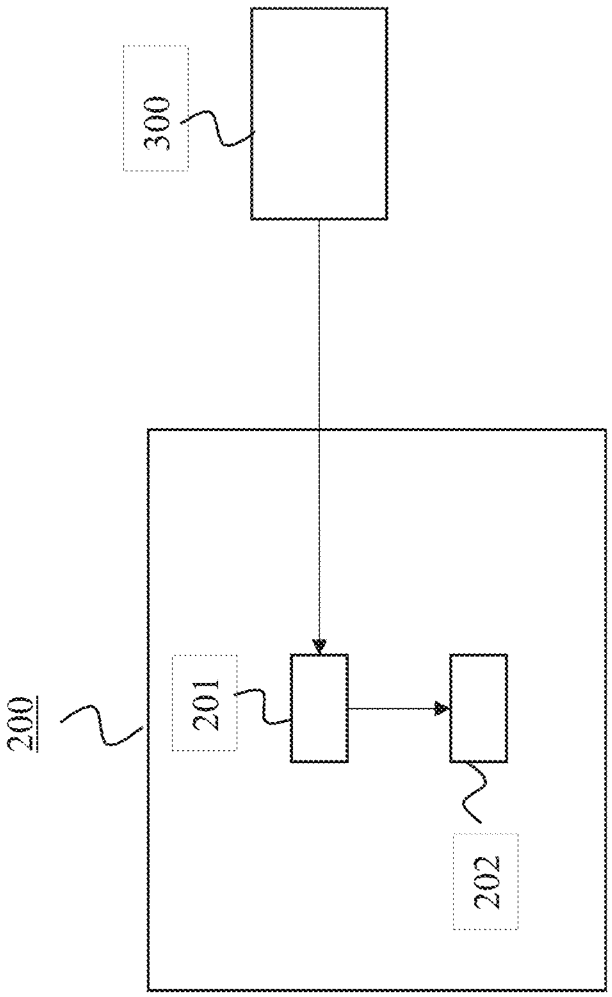
FIG. 2 shows a network entity according to an embodiment of the disclosure.

FIG. 2 shows a network entity 200 adapted for routing a plurality of flow groups in a network according to an embodiment of the disclosure. The network entity 200 may comprise processing circuitry (not shown) configured to perform, conduct or initiate the various operations of the network entity 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The network entity 200 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the network entity 200 to be performed. In one embodiment, the processing circuitry comprises one or more processors and a non-transitory memory connected to the one or more processors. The non-transitory memory may carry executable program code which, when executed by the one or more processors, causes network entity 200 to perform, conduct or initiate the operations or methods described herein.

The network entity 200 is configured to obtain policy information from a controller 300. The policy information 201 comprises one or more global intents and information about at least one SLA requirement for each of the plurality of flow groups. Notably, each global intent is indicative of one requirement of a network operator. The network entity 200 is further configured to make one or more routing decisions 202 for the plurality of flow groups based on the policy information 201.

The network may be a software-defined network, e.g., SD-WAN. This disclosure proposes a solution for intent-based policy routing inside devices. Devices are in support of the network controller to meet global intents. For instance, each global intent may be indicative of a requirement of the network operator related to one of the following: link utilization, financial cost, quality, congestion, safety, stability, and performance. Typically, the network owner may intent to minimize the financial cost of the network, to minimize the network congestion, to maximize the network performance, to maximize the stability of the network (e.g., stick as much as possible to previous configurations), or to maximize the safety of the network (e.g., satisfy a maximum number of SLAs).

In some embodiments, each global intent is associated with a priority or a weight indicating an order of importance of that global intent in the one or more global intents. Notably, the maximization of stability (also called "Stickiness") is often defined as a secondary intent, and the maximization of safety is often defined as a primary intent.

According to an embodiment of this disclosure, the one or more global intents may include a first global intent that is indicative of the requirement related to safety. The first global intent is associated with a highest priority in the one or more global intents, wherein the first global intent indicates the network entity 200 to make the routing decisions 202 that meet the at least one SLA requirement.

Figure 3:
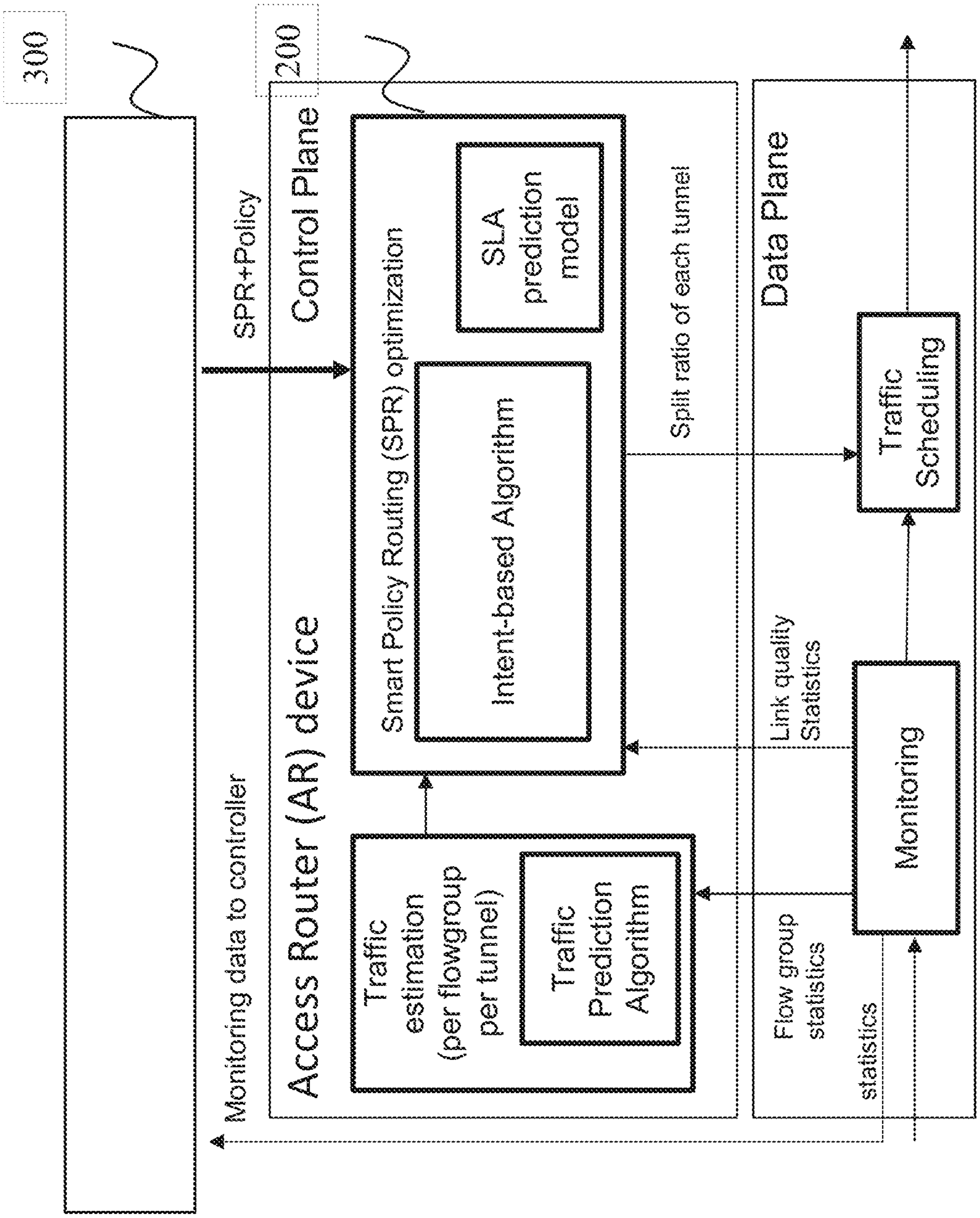
FIG. 3 shows an architecture of an ARaccording to an embodiment of the disclosure.

FIG. 3 shows an architecture of an edge device (a switch or an AR) according to an embodiment of this disclosure. For ease of description, the "AR" is used in the following part.

As shown in FIG. 3, the AR is equipped with a control plane and a data plane. In the data plane, a "Monitoring" module provides for each flow group and per (overlay) link the throughput information and QoS statistics (e.g., delay, jitter, loss rate). A "Traffic Scheduling" module forwards the traffic of each flow group over the set of overlay links enforcing decisions from SPR. For instance, it loads balanced traffic over the set of selected active links with weights that are inversely proportional to the capacity of the physical ports.

In the control plane, an intent-based "Smart Policy Routing (SPR)" module may periodically compute a split ratio or forwarding rules for each flow group based on policy information (the policy information 201). According to this disclosure, the policy information 201 as shown in FIG. 2 comprises one or more global intents and information about at least one SLA requirement for each flow group.

In some embodiments, the policy information 201 further comprises information about a set of overlay links that can be used for routing the plurality of flow groups, wherein each overlay link comprises a plurality of underlay links.

The AR shown in FIG. 3 may further comprise an "SLA prediction model" for providing various QoS factors (i.e., delay, loss, and jitter) for each flow group on each overlay link. The AR may also comprise a "Traffic prediction" module for providing traffic predictions.

Notably, the network entity 200 as shown in FIG. 2 may be the "SPR" module shown in FIG. 3, which is implemented inside the AR.

In some embodiments, the network entity 200 may be configured to obtain a traffic prediction result for each of the plurality of flow groups, wherein the traffic prediction result of each flow group comprises one or more traffic parameters of that flow group. Typically, a flow can be characterized by an average throughput and/or a maximum burst size. The traffic parameter may be a "demand", e.g., the throughput, or other parameters such as peak/burst rate. Traffic demand is typically characterized by the network throughput for a set of origin-destination (OD) flows.

Optionally, the network entity 200 may be configured to obtain an SLA prediction result for each of the plurality of flow groups. The SLA prediction result of each flow group comprises one or more QoS performance indicators (i.e., delay, loss, and jitter) of that flow group.

According to an embodiment of this disclosure, when the network entity 200 makes a routing decision 202 for each of the plurality of flow groups, in addition to the policy information 201, it may further take into account the traffic prediction result and/or the SLA prediction result of that flow group.

FIG. 3 also shows how the AR interacts with a network controller. It should be noted that communication with the controller 300 can be reduced and SLA satisfaction is ensured, due to the use of predictions models for traffic and performance.

In an embodiment of the disclosure, the network entity 200, i.e., the intent-based SPR module, can take decisions by solving an optimization model. In the following example, it is presented a versatile intent optimization model for 5 typical intents:

- Financial cost
- High quality (e.g., minimization of the max delay)
- Congestion (e.g., minimization of the maximum link utilization)
- Stickiness (always as a secondary intent)
- Safety first (always as a primary intent).

These models are combined in the objective function with weights that determine their relative priority or importance.

The inputs of the intent-based SPR optimization model are the following:

$d^k(t)$: Demand of flow group k at timeslot t.

$q^k$: Delay requirement of flow group k.

$M^d$: Maximum delay (e.g., 1s).

$PropD_e$: Propagation delay of link e.

$Cost_e$: Cost of link e (e.g., 20 for MPLS, 10 for Internet).

$Pr^k$: Priority of flow group k.

$\beta^k$: Extra bandwidth ratio of flow group k.

$C_e$: Capacity of link e.

$\overline{C}_e$: Baseline bandwidth of link e.

Notably, $d^k(t)$ maybe given by the traffic prediction module. $q^k$, $Cost_e$, $Pr^k$, and $\beta^k$ maybe defined by the user and communicated to the devices (e.g., the network entity 200) by the network controller 300. $PropD_e$ is given by the monitoring module. The resilient bandwidth cost model is adopted. In this model, a lower price applies to the baseline bandwidth which is agreed between the user and operator. If the user uses more than this threshold, a higher price will be applied.

The outputs (decisions variables) are:

$u^k(t)$: is 1 if the flow group k does not meet SLA, 0 otherwise.

$y^k(t)$: is 1 if the flow group k uses the link e at time t, 0 otherwise.

$D_e(t)>0$: Average delay of link e at time t.

$r_e(t)>0$: Remaining capacity of link e at time t.

$$z_e^{k+}(t):$$

is 1 if link e is used in time slot t but not used in next time slot, 0 otherwise.

$$z_e^{k-}(t):$$

is 1 if link e is not used in time slot t but used in next time slot, 0 otherwise.

$S_e(t)$: Slack variable for capacity of link e.

$D^k(t)$: Delay of flow group k at time slot t.

$$\rho_e^k(t):$$

Load of flow group k on link e.

$$\phi_e^h(t):$$

Load of priority h on link e.

$LU_e(t)$: Link utilization of link e.

$$LU_e^-(t),\ LU_e^+(t):$$

Link utilization below and above the baseline bandwidth.

MLU: Maximum link utilization.

$$W_e^h(t):$$

waiting time of priority h on link e.

It should be noted that $y^k(t)$ is the main output and will be sent to the Traffic scheduler module to redirect the incoming flows to the appropriate overlay link.

The intent-based load balancing optimization model may be expressed as:

$$\min \sum_t \sum_k W_{SLA} Pr^k u^k(t) + \sum_e \sum_t MS_e(t) + \sum \sum_t \sum_k W_s\left(z_e^{k+}(t) + z_e^{k-}(t)\right) + \sum_t \sum_k W_D D_k(t) + MLU + \sum_{k\in K, e\in E_k} (150LU_e^-(t) + 1500LU_e^+(t)),$$

wherein:

$$\rho_e^k(t) = \frac{d^k(t)\beta^k}{C_e + S_e(t)} \frac{C_e y_e^k(t)}{\sum_{e'} C_{e'} y_{e'}^k(t)},\ \forall e, t, k \tag{1}$$

$$\phi_e^h(t) = \sum_{k\in F_h} \rho_e^k(t),\ \forall h, e, t \tag{2}$$

$$\sum_{k\in K, e\in E_k} d^k(t)\beta^k \frac{C_e y_e^k(t)}{\sum_{e'\in E_k} C_{e'} y_{e'}^k(t)} = LU_e(t),\ \forall e \in E, \forall t \in T \tag{3}$$

$$LU_e^-(t) + LU_e^+(t) = LU_e(t),\ \forall e \in E, \forall t \in T \tag{4}$$

$$U_e(t) \le C_e MLU,\ \forall e \in E, \forall t \in T \tag{5}$$

$$C_e - \overline{C_e} + S_e(t) = r_e(t) + LU_e^+(t),\ \forall e \in E, \forall t \in T \tag{6}$$

$$\overline{C_e} = \overline{r_e(t)} + LU_e^-(t),\ \forall e \in E, \forall t \in T \tag{7}$$

$$W_e^h(t) = \frac{W_e^{h-1}(t)\left(1 - \sum_{h''\le h-2} \phi_e^{h''}(t)\right)}{1 - \sum_{h'\le h} \phi_e^{h'}(t)},\ \forall h > 1, e, t \tag{8}$$

$$W_e^1(t) = \frac{\text{packetsize} \sum \phi_e^h(t)}{2 * C_e\left(1 - \phi_e^1(t)\right)},\ \forall e, t \tag{9}$$

$$D_k(t) \le q^k + M_d u^k(t),\ \forall k \in K, \forall t \in T \tag{10}$$

$$y_e^k(t) - y_e^k(t+1) \le z_e^{k+}(t),\ \forall e, k \tag{11}$$

$$y_e^k(t+1) - y_e^k(t) \le z_e^{k-}(t),\ \forall e, k \tag{12}$$

$$D_k(t) \ge y_e^k(t)\left(W_e^{h_k}(t) + \text{Prop}_e + \frac{\text{packetsize}}{C_e}\right),\ \forall e, k \tag{13}$$

This model is a non-linear optimization model and it can be solved by a solver (e.g., SCIP solver for instance). The objective has multiple terms related to different available intents. A user can select or combine intents by adjusting the weights. Constraints (1) and (2) are to compute a load of a flow group/a priority on a link which will be exploited to compute the waiting delay using the Non-Preemptive Queuing (NPQ) model from queuing theory for strict priority schedulers in (8) and (9). Constraints (3)-(7) are to determine the link utilization of each link, the amount of traffic below and above the baseline bandwidth, and the MLU. Constraint (13) is to derive the delay of a flow group and constraint (10) determines if the delay meets its SLA requirements. Constraints (11) and (12) are to compare the difference between the output and the current solution. Faster heuristic algorithms can also be derived if a solver cannot be used.

It should be noted that, in another example, the network entity 200 may be the AR as shown in FIG. 3, which includes the "SPR" module.

In some embodiments, the network entity 200 may be further configured to monitor the plurality of flow groups to obtain statistical information for each of the plurality of flow groups. For instance, the statistical information for each flow group may comprise at least one of the throughput information and a QoS statistics of that flow group. In some embodiments, the network entity 200 may be further configured to perform traffic prediction on each of the plurality of flow groups based on the statistical information of that flow group, to obtain the traffic prediction result of each of the plurality of flow groups.

In some embodiments, the traffic prediction is performed using a traffic prediction model. Possibly, the traffic prediction models can be already embedded into the devices. The network entity 200 may be further configured to obtain one or more traffic prediction parameters related to the traffic prediction from the controller 300. The parameters related to traffic predictions may be used for selecting a particular traffic prediction model (History-based, SARIMA, machine learning) to use. That is, network entity 200 may be further configured to select the traffic prediction model from one or more trained models using the one or more traffic prediction parameters.

In some embodiments, the parameters may be used as model parameters for configuring the selected model with some parameters. In such a case, the network entity 200 may be further configured to train the traffic prediction model using the one or more traffic prediction parameters.

In some embodiments, the network entity 200 may be further configured to provide the statistical information of the plurality of flow groups to the controller 300.

In some embodiments, the network entity 200 may be further configured to perform SLA prediction for each of the plurality of flow groups and for each overlay link of the set of overlay links using an SLA prediction model, to obtain the SLA prediction result of each of the plurality of flow groups. Possibly, the network entity 200 may be further configured to obtain one or more SLA prediction parameters related to the SLA prediction from the controller 300.

The parameters related to SLA predictions may be used for determining or activating the SLA prediction model using the one or more SLA prediction parameters. For instance, the SLA prediction model may be a closed-form model from queuing theory or network calculus to be used. Alternatively, the SLA prediction model may be a machine learning model.

According to an embodiment of this disclosure, the network entity 200 may periodically make the one or more routing decisions 202 for the plurality of flow groups. According to another embodiment of this disclosure, the network entity 200 may make the one or more routing decisions 202 for the plurality of flow groups in response to one or more trigger-events.

The controller can collect information about intent capabilities of devices. In some embodiments, the network entity 200 may be further configured to provide information about whether the network entity 200 supports a particular global intent to the controller 300.

It may be worth mentioning that, the intents can be defined globally for all applications, or dedicated for different groups of applications/tenants. They can also be different depending on devices (e.g., core routers versus access routers).

According to an embodiment of this disclosure, the policy information 201 comprises a first set of global intents dedicated for a first group of applications running on the network entity 200, and a second set of global intents dedicated for a second group of applications running on the network entity 200. Possibly, the first group of applications and the second group of applications may have different QoS requirements. For instance, the first group may require moderate traffic and high SLA requirements (Real-time type). The second group may require high traffic and moderate SLA requirements (Business type), or moderate traffic and low/no SLA requirements (Bulk type).

The previous embodiments discuss making routing decisions based on policy information including global intents. It should be noted that this disclosure can also apply to load balancing. In some embodiments, the network entity 200 may be further configured to make one or more load balancing decisions for the plurality of flow groups based on the policy information 201.

In some embodiments, in addition to the policy information 201, the network entity 200 may make a load balancing decision for each of the plurality of flow groups based on the policy information 201, and the traffic prediction result and/or the SLA prediction result of that flow group. Details are similar as discussed in the previous embodiments related to making routing decisions.

Notably, a main aspect of this application is that intents are provided to routers (objectives to optimize). As the optimization of intents can conflict with the optimization of SLAs, prediction models need to be embedded into devices so that the intent-based SPR module makes efficient decisions (e.g., routing decisions or load balancing decisions), i.e., so that it can anticipate the consequences of the decisions it is taking.

Figure 4:
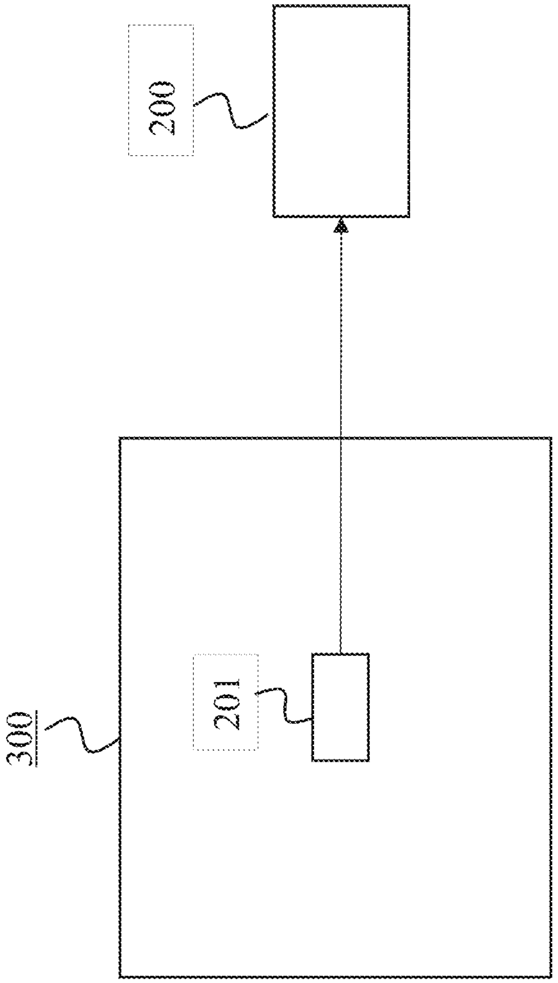
FIG. 4 shows a controller according to an embodiment of the disclosure.

FIG. 4 shows a controller 300 according to an embodiment of the disclosure. The controller 300 may comprise processing circuitry (not shown) configured to perform, conduct or initiate the various operations of the controller 300 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The controller 300 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the controller 300 to be performed. In one embodiment. the processing circuitry comprises one or more processors and a non-transitory memory connected to the one or more processors. The non-transitory memory may carry executable program code which, when executed by the one or more processors, causes the controller 300 to perform, conduct or initiate the operations or methods described herein.

In particular, the controller 300 is adapted for assisting in routing a plurality of flow groups in a network. The controller is configured to provide policy information 201 to a network entity 200, wherein the policy information 201 comprises one or more global intents and information about at least one SLA requirement for each of the plurality of flow groups, wherein each global intent is indicative of one requirement of a network operator.

This disclosure further proposes a controller for providing necessary information to the network entity 200 and thus assisting the network entity 200 in making routing or load balancing decisions. The network entity 200 may be the network entity shown in FIG. 2 or FIG. 3.

As discussed in previous embodiments, each global intent may be indicative of a requirement of the network operator related to one of the following: link utilization, financial cost, quality, congestion, safety, stability, and performance. In some embodiments, each global intent may be associated with a priority or a weight indicating an order of importance of that global intent in the one or more global intents.

In some embodiments, the policy information 201 further comprises information about a set of overlay links that can be used for routing the plurality of flow groups, wherein each overlay link comprises a plurality of underlay links.

According to an embodiment of the disclosure, the controller 300 may be further configured to provide one or more traffic prediction parameters related to traffic prediction, to the network entity 200.

In some embodiments, the controller 300 may be further configured to provide one or more SLA prediction parameters related to SLA prediction, to the network entity 200.

According to an embodiment of the disclosure, the controller 300 may be further configured to obtain statistical information of the plurality of flow groups from the network entity 200, wherein the statistical information of each flow group comprises at least one of throughput information and a QoS statistics of that flow group.

According to an embodiment of the disclosure, the controller 300 may be further configured to obtain information about whether the network entity 200 supports a particular global intent from the network entity 200.

Accordingly, the controller 300 may provide the policy information 201 based on the obtained information about whether the network entity 200 supports a particular global intent.

Figure 5:
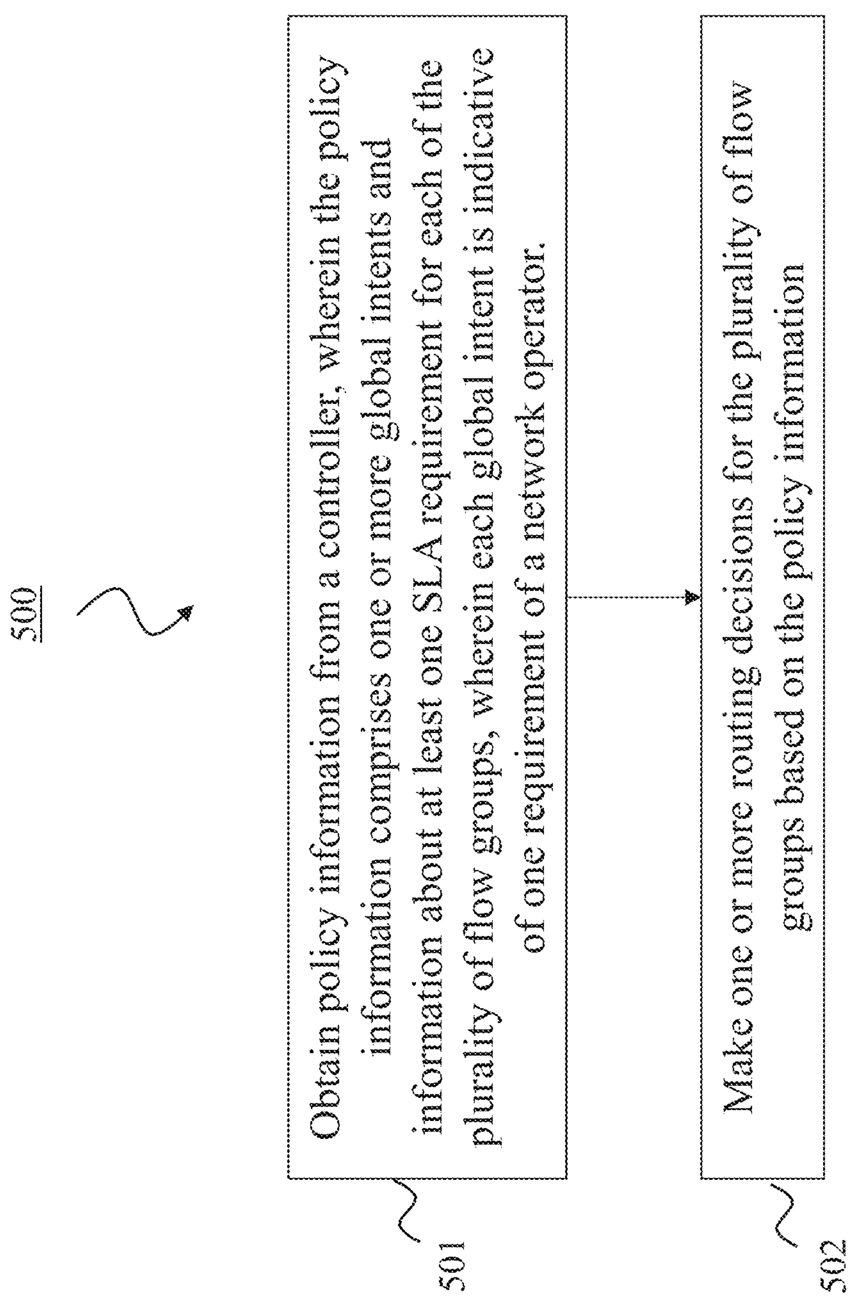
FIG. 5 shows a method according to an embodiment of the disclosure.

FIG. 5 shows a method 500 according to an embodiment of the disclosure, particularly for routing a plurality of flow groups in a network. In a particular embodiment, the method 1000 is performed by the network entity 200 shown in FIG. 2. The method 500 comprises a step 501 of obtaining policy information 201 from a controller 300, wherein the policy information 201 comprises one or more global intents and information about at least one SLA requirement for each of the plurality of flow groups. Notably, each global intent is indicative of one requirement of a network operator. The method 500 further comprises a step 502 of making one or more routing decisions 202 for the plurality of flow groups based on the policy information 201. Possibly, the controller 300 is the controller shown in FIG. 4.

Figure 6:
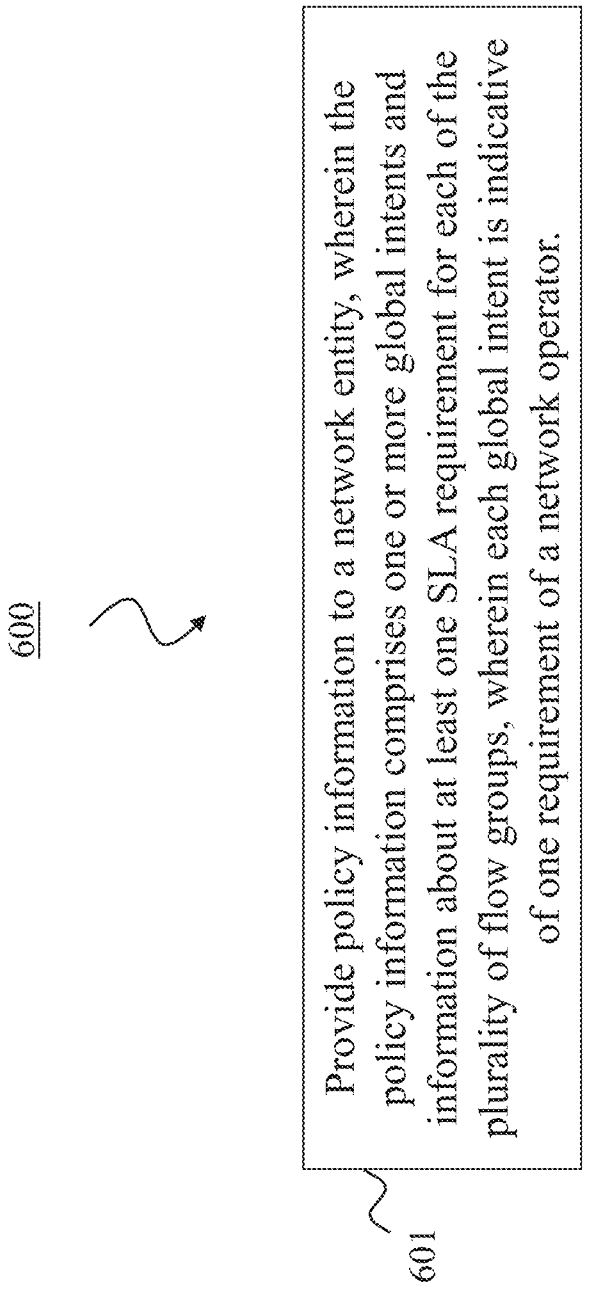
FIG. 6 shows a method according to an embodiment of the disclosure.

FIG. 6 shows a method 600 according to an embodiment of the disclosure, particularly for assisting in routing a plurality of flow groups in a network. In a particular embodiment, the method 1100 is performed by a controller 300 shown in FIG. 4. The method 600 comprises a step 601 of providing policy information 201 to a network entity 200. The policy information 201 comprises one or more global intents and information about at least one SLA requirement for each of the plurality of flow groups. wherein each global intent is indicative of one requirement of a network operator. Possibly. the network entity 200 is the network entity shown in FIG. 2 or FIG. 3.

In the disclosure. an apparatus and method for intent-based SPR are proposed. Embodiments of the disclosure provide an intent-based policy routing system for network devices. Network devices are enabled to decide load balancing or routing for each flow group they managed based on SLA requirements and global intents. Predictions can also be used (optional). Global intents can be related to the minimization of financial costs. network congestion. or the maximization of performance (i.e., so-called "high quality" intent). Further. configuration updates may be received at a slow frequency from the network controller. Updates may contain intent parameters and performance prediction models.

The present disclosure has been described in conjunction with various embodiments as examples as well as implementations. However, other variations can be understood and effected by those persons skilled in the art and practicing the claimed embodiments of the disclosure. from the studies of the drawings. this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore. any method according to embodiments of the disclosure may be implemented in a computer program. having code means. which when run by processing means causes the processing means to execute the steps of the method. The computer program is included in a computer-readable medium of a computer program product. The computer-readable medium may comprise essentially any memory. such as a ROM (Read-Only Memory), a PROM (Programmable Read-Only Memory). an EPROM (Erasable PROM). a Flash memory, an EEPROM (Electrically Erasable PROM), or a hard disk drive.

Moreover. it is realized by the skilled person that embodiments of the network entity 200. or the controller 300. comprises the necessary communication capabilities in the form of e.g., functions. means. units. elements. etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the network entity 200, or the controller 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

The invention claimed is:

1. A network entity for routing a plurality of flow groups in a network, the network entity comprising:

a memory; and a processor, coupled with the memory, configured to:

obtain policy information from a controller, wherein the policy information comprises one or more global intents and information about at least one service level agreement (SLA) requirement for each of the plurality of flow groups, wherein each global intent is indicative of one requirement of a network operator, wherein each global intent is associated with a priority or a weight indicating an order of importance of that global intent in the one or more global intents, wherein the one or more global intents includes a first global intent that is indicative of the requirement related to safety, and the first global intent is associated with a highest priority in the one or more global intents; and make one or more routing decisions for the plurality of flow groups based on the policy information, wherein the first global intent indicates the network entity to make the routing decisions that meet the at least one SLA requirement.

2. The network entity according to claim 1, wherein each global intent is indicative of a requirement of the network operator related to at least one of the following: link utilization, financial cost, quality, congestion, safety, stability, and performance.

3. The network entity according to claim 1, wherein the policy information further comprises information about a set of overlay links that can be used for routing the plurality of flow groups, wherein each overlay link comprises a plurality of underlay links.

4. The network entity according to claim 1, wherein the processor is further configured to:

obtain at least one of a traffic prediction result for each of the plurality of flow groups or an SLA prediction result for each of the plurality of flow groups, wherein the traffic prediction result of each flow group comprises one or more traffic parameters of that flow group or the SLA prediction result of each flow group comprises one or more quality of service performance indicator of that flow group.

5. The network entity according to claim 4, wherein the processor configured to make the one or more routing decisions for the plurality of flow groups comprises the processor further configured to: make a routing decision for each of the plurality of flow groups based on the policy information, and the at least one of the traffic prediction result of that flow group or the SLA prediction result of that flow group.

6. The network entity according to claim 4, the processor further configured to:

obtain one or more traffic prediction parameters related to the traffic prediction from the controller; and select a traffic prediction model from one or more trained models using at least one of the one or more traffic prediction parameters or train the traffic prediction model using the one or more traffic prediction parameters, wherein the traffic prediction model is configured to obtain the traffic prediction result.

7. The network entity according to claim 4, the processor further configured to:

perform SLA prediction for each of the plurality of flow groups and for each overlay link of a set of overlay links using an SLA prediction model, to obtain the SLA prediction result of each of the plurality of flow groups.

8. The network entity according to claim 7, the processor further configured to:

obtain one or more SLA prediction parameters related to the SLA prediction from the controller; and determine or activate the SLA prediction model using the one or more SLA prediction parameters.

9. The network entity according to claim 1, wherein more global intents includes a second global intent that is indicative of the requirement related to stability, and the second global intent is associated with a second highest priority in the one or more global intents, wherein the second global intent indicates the network entity to make the one or more routing decisions that minimize changes on one or more previous routing decisions.

10. The network entity according to claim 1, the processor further configured to:

provide information about whether the network entity supports a particular global intent to the controller.

11. The network entity according to claim 1, wherein the policy information comprises a first set of global intents dedicated for a first group of applications running on the network entity, and a second set of global intents dedicated for a second group of applications running on the network entity.

12. The network entity according to claim 1, the processor further configured to:

make one or more load balancing decisions for the plurality of flow groups based on the policy information.

13. The network entity according to claim 12, wherein the processor configured to make the one or more load balancing decisions for the plurality of flow groups comprises the processor further configured to: make a load balancing decision for each of the plurality of flow groups based on the policy information, and at least one of a traffic prediction result of that flow group or a SLA prediction result of that flow group.

14. The network entity according to claim 1, wherein the network entity is an access router, and the network is a software-defined network.

15. A controller for assisting of routing a plurality of flow groups in a network, the controller comprising:

a memory; and a processor, coupled with the memory, configured to:

provide policy information to a network entity, wherein the policy information comprises one or more global intents and information about at least one service level agreement (SLA) requirement for each of the plurality of flow groups, wherein each global intent is indicative of one requirement of a network operator, wherein each global intent is associated with a priority or a weight indicating an order of importance of that global intent in the one or more global intents, wherein the one or more global intents includes a first global intent that is indicative of the requirement related to safety, and the first global intent is associated with a highest priority in the one or more global intents, and wherein the first global intent indicates the network entity to make routing decisions that meet the at least one SLA requirement.

16. The controller according to claim 15, the processor further configured to:

provide at least one of one or more traffic prediction parameters related to traffic prediction or one or more SLA prediction parameters related to SLA prediction, to the network entity.

17. The controller according to claim 15, wherein the processor configured to provide policy information to a network entity further comprises the processor configured to:

provide the policy information based on obtained information about whether the network entity supports a particular global intent.

18. A method for routing a plurality of flow groups in a network, wherein the method comprises:

obtaining policy information from a controller, wherein the policy information comprises one or more global intents and information about at least one service level agreement (SLA) requirement for each of the plurality of flow groups, wherein each global intent is indicative of one requirement of a network operator, wherein each global intent is associated with a priority or a weight indicating an order of importance of that global intent in the one or more global intents, wherein the one or more global intents includes a first global intent that is indicative of the requirement related to safety, and the first global intent is associated with a highest priority in the one or more global intents; and making one or more routing decisions for the plurality of flow groups based on the policy information, wherein the first global intent indicates to make the routing decisions that meet the at least one SLA requirement.

* * * * *